(12) United States Patent
Becker et al.

(10) Patent No.: US 8,127,735 B2
(45) Date of Patent: Mar. 6, 2012

(54) ENGINE ASSEMBLY WITH VALVE SEAT VENT PASSAGES AND METHOD OF FORMING

(75) Inventors: Edward P. Becker, Brighton, MI (US); David L Moore, Madison Heights, MI (US)

(73) Assignee: GM Global Technology Operations LLC

( * ) Notice: Subject to any disclaimer, the term of this patent is extended or adjusted under 35 U.S.C. 154(b) by 522 days.

(21) Appl. No.: 12/400,373

(22) Filed: Mar. 9, 2009

(65) Prior Publication Data

US 2010/0224160 A1    Sep. 9, 2010

(51) Int. Cl.
*F01L 3/00* (2006.01)
*B21K 1/24* (2006.01)

(52) U.S. Cl. ............... 123/188.8; 123/188.1; 123/188.2; 123/188.3; 29/888.4; 29/888.44; 29/888.41

(58) Field of Classification Search .... 123/188.1–188.3, 123/188.8; 29/888.4, 888.41, 888.44
See application file for complete search history.

(56) References Cited

U.S. PATENT DOCUMENTS

| | | | | |
|---|---|---|---|---|
| 1,720,486 A * | 7/1929 | Leipert | ...... | 29/888.06 |
| 2,035,165 A * | 3/1936 | Jardine | ...... | 123/188.8 |
| 4,108,132 A * | 8/1978 | Hayashi | ...... | 123/188.8 |
| 4,522,161 A * | 6/1985 | Slee | ...... | 123/41.85 |
| 6,260,531 B1 | 7/2001 | Haan et al. | | |
| 7,063,051 B2 * | 6/2006 | Schellhase | ...... | 123/41.85 |

FOREIGN PATENT DOCUMENTS

| | | | |
|---|---|---|---|
| DE | 3937402 A1 * | 5/1991 | |
| GB | 2127098 A * | 4/1984 | |
| JP | 06042320 A * | 2/1994 | |

\* cited by examiner

*Primary Examiner* — Michael Cuff
*Assistant Examiner* — Hung Q Nguyen
(74) *Attorney, Agent, or Firm* — Harness, Dickey & Pierce, P.L.C.

(57) ABSTRACT

An engine assembly may include an engine block defining a cylinder bore, a cylinder head fixed to the engine block, and a valve seat insert. The cylinder head may include an intake port, defining an inlet in fluid communication with an air source and an outlet in fluid communication with the cylinder bore. The valve seat may be defined at the outlet of the intake port and may include a stepped region. The stepped region may define a seating surface extending radially outward from the intake port. The seating surface may include a series of protrusions circumferentially spaced from one another around the outlet and forming a series of recesses therebetween. The valve seat insert may be located within the stepped region and may include a first axial end surface abutting the protrusions on the seating surface.

20 Claims, 3 Drawing Sheets

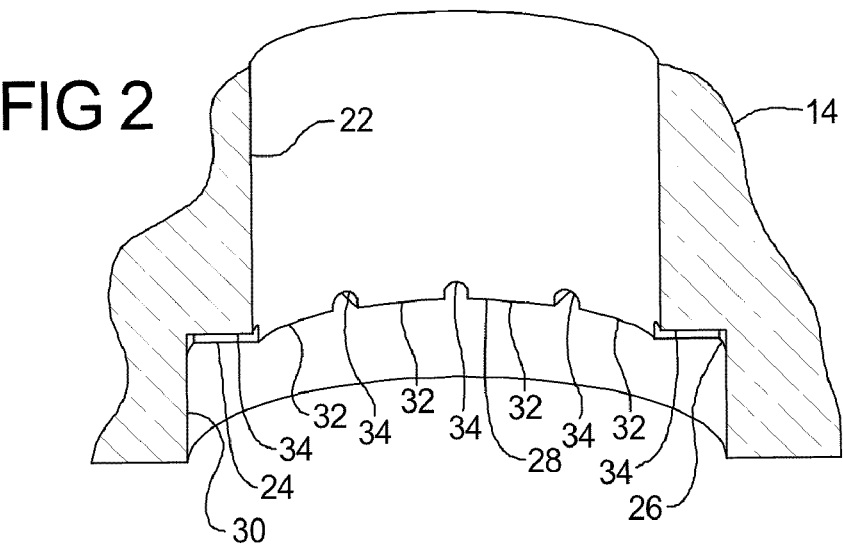
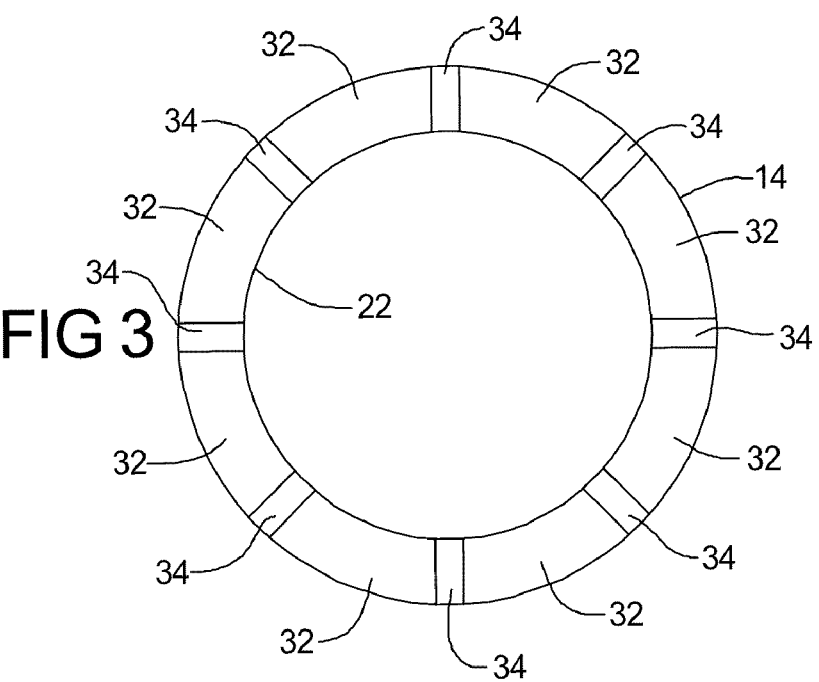
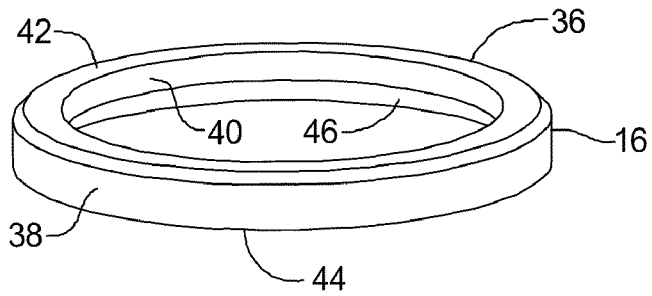

ENGINE ASSEMBLY WITH VALVE SEAT VENT PASSAGES AND METHOD OF FORMING

FIELD

The present disclosure relates to engine cylinder head intake ports.

BACKGROUND

This section provides background information related to the present disclosure which is not necessarily prior art.

Engine assemblies may include a cylinder head defining an intake port having a valve seat insert disposed therein. The interface between the valve seat insert and the cylinder head may include a small gap allowing for the introduction of fuel during injection events. This small gap may trap the fuel between the valve seat insert and cylinder head. In engines burning fuel containing higher percentages of ethanol, this trapped fuel may result in corrosion of the cylinder head. One solution to this problem has been to form passages in the valve seat insert. However, the use of these modified valve seat inserts requires extensive modification to dies used in the manufacture of the traditional inserts or additional expensive machining of existing inserts.

SUMMARY

This section provides a general summary of the disclosure, and is not comprehensive of its full scope or all of its features.

An engine assembly may include an engine block defining a cylinder bore, a cylinder head fixed to the engine block, and a valve seat insert. The cylinder head may include an intake port, defining an inlet in fluid communication with an air source and an outlet in fluid communication with the cylinder bore. The valve seat may be defined at the outlet of the intake port and may include a stepped region. The stepped region may define a seating surface extending radially outward from the intake port. The seating surface may include a series of protrusions circumferentially spaced from one another around the outlet and forming a series of recesses therebetween. The valve seat insert may be located within the stepped region and may include a first axial end surface abutting the protrusions on the seating surface.

A method of forming a cylinder head may include casting a cylinder head defining an intake port including a valve seat at an outlet of the intake port. The valve seat may define a stepped region having a seating surface extending radially outward from the intake port. The method may further include forming a series of circumferentially spaced recesses in the seating surface separated by a series of protrusions. A valve seat insert may be secured within the stepped region. The valve seat insert may include an axial end surface abutting the protrusions after the securing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way.

FIG. 2 is a fragmentary section view of a cylinder head of the engine assembly of FIG. 1;

FIG. 3 is a plan view of the cylinder head of FIG. 2;

FIG. 4 is a perspective view of a valve seat insert of the engine assembly of FIG. 1;

Corresponding reference numerals indicate corresponding parts throughout the several views of the drawings.

DETAILED DESCRIPTION

Figure 1:
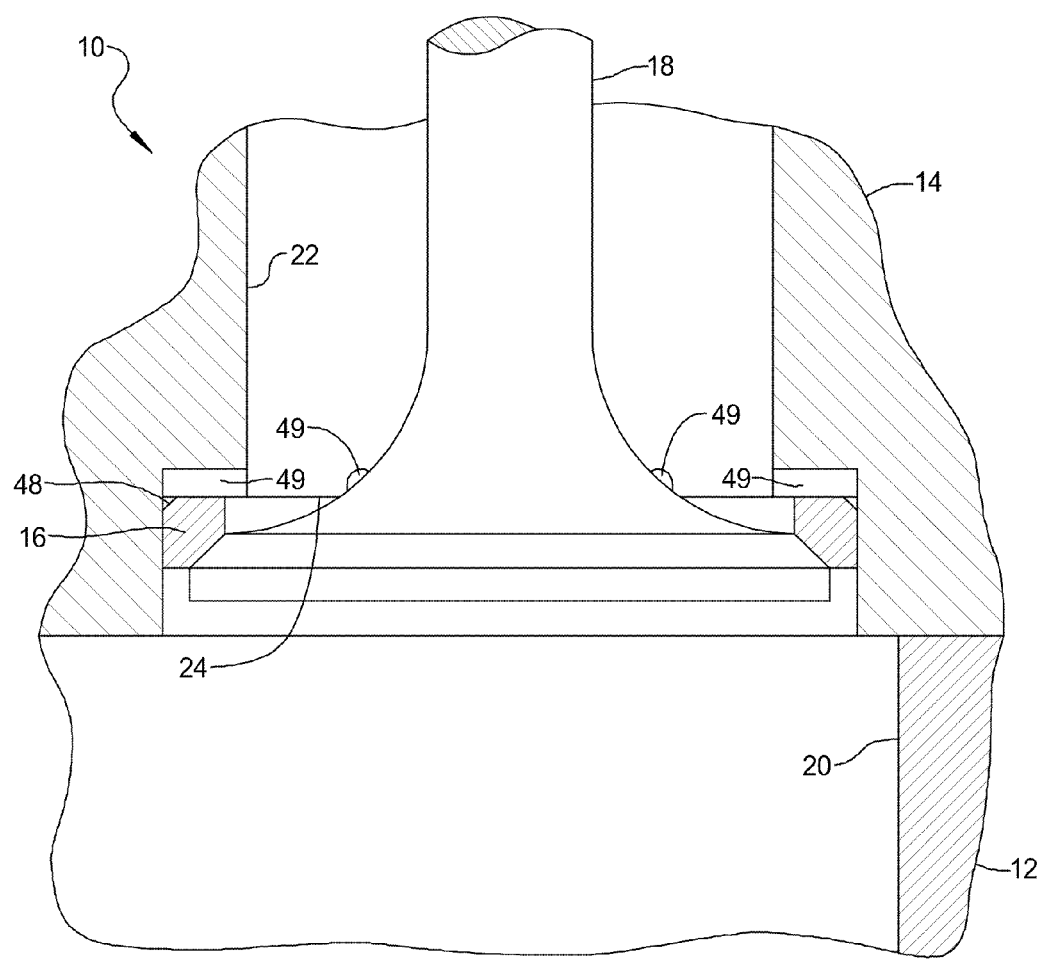
FIG. 1 is a schematic illustration of a portion of an engine assembly according to the present disclosure.

Examples of the present disclosure will now be described more fully with reference to the accompanying drawings. The following description is merely exemplary in nature and is not intended to limit the present disclosure, application, or uses.

Referring to FIGS. 1-4, an engine assembly 10 may include an engine block 12, a cylinder head 14, a valve seat insert 16, and a valve 18. The engine block 12 may define a cylinder bore 20. The cylinder head 14 may be fixed to the engine block 12 and may define an intake port 22 and a valve seat 24.

The valve seat 24 may be defined as an outlet of the intake port 22 and may include a stepped region 26. The stepped region 26 may include an axial end surface 28, an inner radial surface 30, protrusions 32, and recesses 34. The cylinder head features discussed above may be formed integrally as a single casting. Alternatively, the protrusions 32 and recesses 34 may be formed in the cylinder head 14 after casting.

The valve seat insert 16 may include an annular body 36 having an outer radial surface 38, an inner radial surface 40, a first axial end surface 42, a second axial end surface 44, and a valve seating surface 46. The first axial end surface 42 may define a generally continuous planar surface. The valve seat insert 16 may be located within the valve seat 24 of the cylinder head 14. More specifically, the first axial end surface 42 may abut the protrusions 32 on the stepped region 26. The outer radial surface 38 of the valve seat insert 16 may abut and be frictionally engaged with the inner radial surface 30 of the stepped region 26, securing the valve seat insert 16 within the valve seat 24.

During engine operation, an air and fuel mixture may be provided to the intake port 22. The valve 18 may be selectively displaced from the valve seat insert 16 to provide communication between the intake port 22 and the cylinder bore 20, allowing the air and fuel mixture to travel to the cylinder bore 20. The valve seat insert 16 and the stepped region 26 may cooperate to define an annular recess 48 therebetween. The protrusions 32, the recesses 34, and the first axial end surface 42 may define a series of radial passages 49 providing fluid communication axially between the valve seat insert 16 and the valve seat 24 of the cylinder head 14. The radial passages 49 may generally allow fuel present in the intake port 22 to travel freely between the first axial end surface 42 of the valve seat insert 16 and the valve seat 24 of the cylinder head 14. Allowing this free flow of fuel may limit formation of corrosive byproducts, or acids, between valve seat insert 16 and the valve seat 24.

Figure 5:
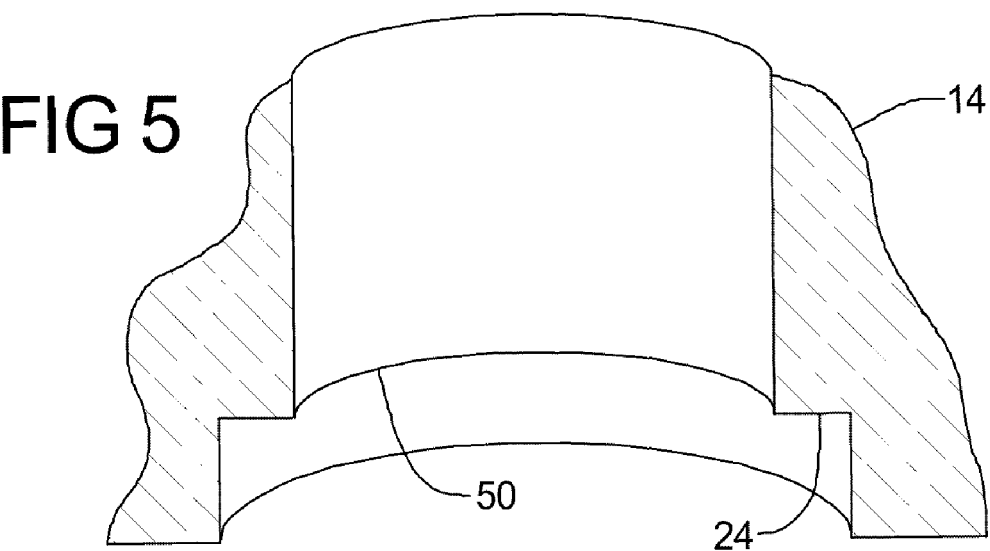
FIG. 5 is a fragmentary section view of the cylinder head of FIG. 2 in an initial state.
Figure 6:
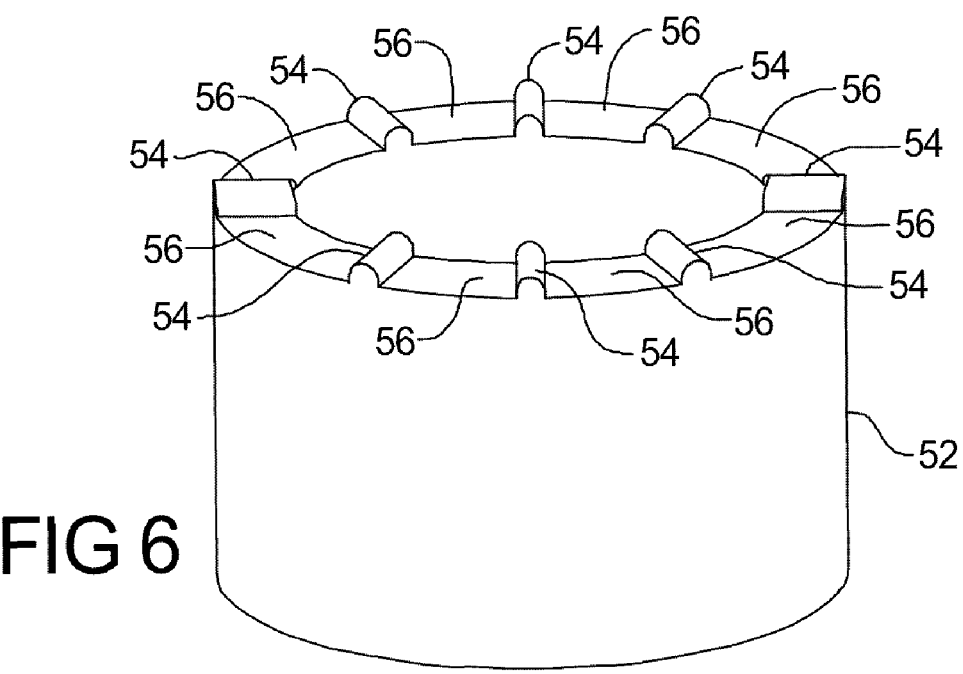
FIG. 6 is a perspective view of a tool according to the present disclosure.

The valve seat 24 of the cylinder head 14 may be formed in a variety of ways. With reference to FIGS. 5 and 6, in a first non-limiting example, the cylinder head 14 may be formed as a casting and the recesses 34 may be formed by a deforming process. After casting, the valve seat 24 may define a generally planar surface 50. In a non-limiting example, the valve seat 24 may be machined after casting to define the planar surface 50. A tool 52 may be forced against the planar surface 50 to create the recesses 34.

The tool 52 may include a series of protrusions 54 circumferentially spaced by recesses 56. The tool 52 may be formed from a material having a greater hardness than the planar surface 50 of the cylinder head 14. By way of non-limiting example, the cylinder head 14 may be cast from aluminum and the tool 52 may be formed from hardened steel. The protrusions 54 may include a variety of shapes for forming the recesses 34 in the planar surface 50. In the present non-limiting example, the protrusions 54 are shown having a generally arcuate shape. However, it is understood that the protrusions 54 may take on any shape suitable to form the recesses 34 in the planar surface 50.

As discussed above, the tool 52 may be forced against the planar surface 50 to create the recesses 34. The tool 52 may be forced in a direction generally perpendicular to the planar surface 50 and the protrusions 54 may engage and deform the planar surface 50, forming the recesses 34. More specifically, the protrusions 54 may indent the planar surface 50, forming the recesses 34 on the stepped region 26 of the cylinder head 14. The planar surface 50 may be free from engagement with the tool 52 at the recesses 56 on the tool 52. Alternatively, the recesses 56 may abut the planar surface 50 to form a stop for the tool 52.

It is understood that the recesses 34 may be formed in a variety of alternate ways. In a first alternate method, the recesses 34 may be machined into the axial end surface 28 after the cylinder head 14 has been cast. In yet another method, the protrusions 32 and recesses 34 may be cast into the cylinder head 14 during formation thereof.

What is claimed is:

1. An engine assembly comprising:
   an engine block defining a cylinder bore;
   a cylinder head fixed to the engine block and including an intake port including an inlet in fluid communication with an air source and an outlet in fluid communication with the cylinder bore, the intake port defining a valve seat at the outlet thereof and including a stepped region, the stepped region defining a seating surface extending radially outward from the intake port, the seating surface including a series of protrusions circumferentially spaced from one another around the outlet and forming a series of recesses therebetween; and
   a valve seat insert located within the stepped region and including a first axial end surface abutting the protrusions on the seating surface.

2. The engine assembly of claim 1, wherein the valve seat insert and the intake port define an annular recess located radially outward relative to an inner radial surface of the valve seat insert.

3. The engine assembly of claim 2, wherein the recesses in the seating surface provide fluid communication between the annular recess and a central portion of the intake port.

4. The engine assembly of claim 1, wherein the valve seat insert includes a second axial end surface opposite the first axial end surface providing a seating surface for an intake valve.

5. The engine assembly of claim 1, wherein the intake port includes first and second radial wall portions, the seating surface located axially between the first and second radial wall portions and the recesses extending radially from the first radial wall surface to the second radial wall surface.

6. The engine assembly of claim 5, wherein the valve seat insert includes an outer radial surface frictionally engaged with the second radial wall portion of the intake port.

7. The engine assembly of claim 1, wherein the first axial end surface of the valve seat insert defines a generally planar continuous surface.

8. The engine assembly of claim 7, wherein the valve seat insert defines a contoured outer surface located radially between the first axial end surface and an outer radial wall of the valve seat insert, the contoured outer surface forming an annular recess between the valve seat insert and the intake port.

9. A method comprising:
   casting a cylinder head defining an intake port including a valve seat at an outlet of the intake port, the valve seat defining a stepped region having a seating surface extending radially outward from the intake port;
   forming a series of circumferentially spaced recesses in the seating surface separated by a series of protrusions; and
   securing a valve seat insert within the stepped region, the valve seat insert including an axial end surface abutting the protrusions after the securing.

10. The method of claim 9, wherein the forming the series of circumferentially spaced recesses includes casting the series of recesses and protrusions with the cylinder head.

11. The method of claim 9, wherein the forming the series of circumferentially spaced recesses includes machining the series of recesses in the cylinder head after the casting.

12. The method of claim 9, wherein the forming the series of circumferentially spaced recesses includes deforming the seating surface, the deforming indenting the seating surface to form the recesses.

13. The method of claim 12, wherein the deforming includes forcing a tool having a series of protrusions against the seating surface to form the recesses.

14. The method of claim 13, wherein the tool is formed from a material having a hardness greater than a hardness of the seating surface of the cylinder head.

15. The method of claim 13, wherein the tool is forced in a direction generally perpendicular to the seating surface.

16. The method of claim 13, wherein the protrusions each have a generally arcuate cross-section.

17. The method of claim 12, wherein the seating surface is generally planar before the deforming.

18. The method of claim 17, wherein portions of the planar surface remaining after the deforming form the protrusions.

19. The method of claim 9, wherein the recesses extend in a radial direction.

20. The method of claim 19, wherein the valve seat insert and the stepped region cooperate to define an annular recess, the radially extending recesses providing fluid communication between the annular recess and a central portion of the intake port.

\* \* \* \* \*